United States Patent
Lee et al.

(10) Patent No.: US 8,700,660 B2
(45) Date of Patent: Apr. 15, 2014

(54) CLIENT-SIDE STATEMENT ROUTING FOR PARTITIONED TABLES

(75) Inventors: Juchang Lee, Seoul (KR); Jaeyun Noh, Seoul (KR); Chulwon Lee, Seoul (KR); Michael Muehle, Walldorf (DE); Alexander Schroeder, Berlin (DE); Marco Paskamp, Hansestadt Stendal (DE); Sang Kyun Cha, Seoul (KR)

(73) Assignee: SAP AG, Walldorf (DE)

( * ) Notice: Subject to any disclaimer, the term of this patent is extended or adjusted under 35 U.S.C. 154(b) by 46 days.

(21) Appl. No.: 13/449,063

(22) Filed: Apr. 17, 2012

(65) Prior Publication Data

US 2013/0275457 A1  Oct. 17, 2013

(51) Int. Cl.
*G06F 17/30* (2006.01)

(52) U.S. Cl.
USPC ......................................................... 707/770

(58) Field of Classification Search
USPC .................... 707/770, 999.107, 634, 769
See application file for complete search history.

(56) References Cited

U.S. PATENT DOCUMENTS

| | | | |
|---|---|---|---|
| 6,457,060 B1 * | 9/2002 | Martin et al. | 709/245 |
| 7,123,613 B1 * | 10/2006 | Chawla et al. | 370/389 |
| 7,606,792 B2 * | 10/2009 | Cunningham et al. | 1/1 |
| 7,720,813 B2 * | 5/2010 | Ellsworth et al. | 707/634 |
| 7,917,502 B2 * | 3/2011 | Cheng et al. | 707/718 |
| 8,140,493 B2 * | 3/2012 | Waddington et al. | 707/695 |
| 8,365,153 B2 * | 1/2013 | Chen et al. | 717/140 |
| 2012/0290582 A1 * | 11/2012 | Oikarinen | 707/741 |

FOREIGN PATENT DOCUMENTS

EP WO2012022751 A1 * 2/2012 ............. H04L 29/08

* cited by examiner

*Primary Examiner* — Cam-Linh Nguyen
(74) *Attorney, Agent, or Firm* — Buckley, Maschoff & Talwalkar LLC

(57) ABSTRACT

A system includes reception of a first query from a client device at a first database node of a database instance comprising two or more database nodes, the first query specifying a first database table which is partitioned among two or more of the two or more database nodes, determination of first partitioning metadata of the first database table, the first partitioning metadata usable to identify one of the two or more database nodes based on table key values, compilation of the first query at the first database node to generate first compiled code, and transmission of the first compiled code and the first partitioning metadata from the first database node to the client device.

15 Claims, 9 Drawing Sheets

CLIENT-SIDE STATEMENT ROUTING FOR PARTITIONED TABLES

BACKGROUND

A distributed database system includes two or more database nodes. Each node executes one or more database processes and is associated with respective data storage. To retrieve data from a distributed database, a client application transmits a query to a database node which is designated to receive such queries. The designated database node determines whether it should execute the query or route the query to another database node for execution, and then executes or routes the query based on the determination.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
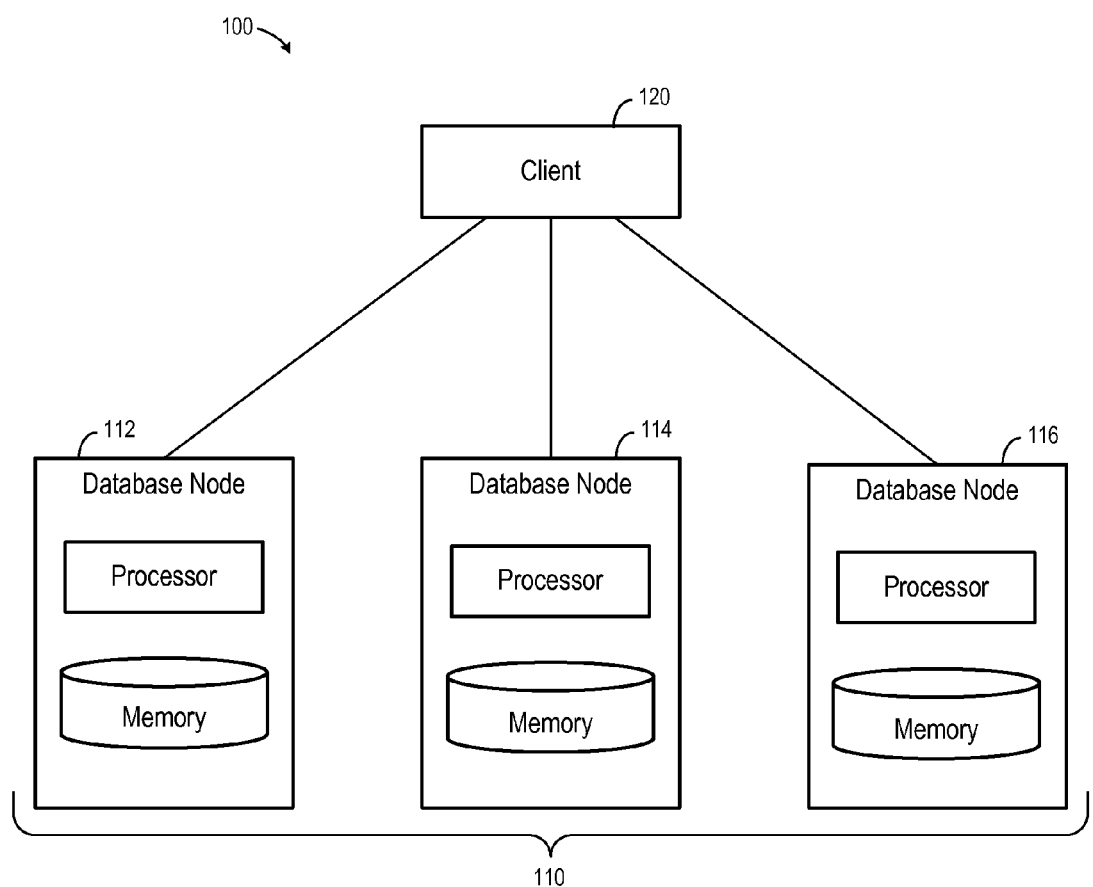
FIG. 1 is a block diagram of a system according to some embodiments.

FIG. 1 is a block diagram of system 100. System 100 represents a logical architecture for describing some embodiments, and actual implementations may include more, fewer and/or different components arranged in any manner. The elements of system 100 may represent software elements, hardware elements, or any combination thereof. For example, system 100 may be implemented using any number of computing devices, and one or more processors within system 100 may execute program code to cause corresponding computing devices to perform processes described herein.

Generally, each logical element described herein may be implemented by any number of devices coupled via any number of public and/or private networks. Two or more of such devices may be located remote from one another and may communicate with one another via any known manner of network(s) and/or via a dedicated connection.

System 100 includes database instance 110, which is a distributed database including database nodes 112, 114 and 116. Each of database nodes 112, 114 and 116 includes at least one processor and a memory device. The memory devices of database nodes 112, 114 and 116 need not be physically segregated as illustrated in FIG. 1, rather, FIG. 1 is intended to illustrate that each of database nodes 112, 114 and 116 is responsible for managing a dedicated portion of physical memory, regardless of where that physical memory is located. The data stored within the memories of database nodes 112, 114 and 116, taken together, represent the full database of database instance 110.

In some embodiments, the memory of database nodes 112, 114 and 116 is implemented in Random Access Memory (e.g., cache memory for storing recently-used data) and one or more fixed disks (e.g., persistent memory for storing their respective portions of the full database). Alternatively, one or more of nodes 112, 114 and 116 may implement an "in-memory" database, in which volatile (e.g., non-disk-based) memory (e.g., Random Access Memory) is used both for cache memory and for storing its entire respective portion of the full database. In some embodiments, the data of the full database may comprise one or more of conventional tabular data, row-based data, column-based data, and object-based data. A single database table may be "partitioned" among two or more of database nodes 112, 114 and 116, as defined by metadata associated with the table. Database instance 100 may also or alternatively support multi-tenancy by providing multiple logical database systems which are programmatically isolated from one another.

According to some embodiments, database nodes 112, 114 and 116 each execute a database server process to provide the data of the full database to database applications. More specifically, database instance 110 may communicate with one or more database applications executed by client 120 over one or more interfaces (e.g., a Structured Query Language (SQL)-based interface) in order to provide data thereto. Client 120 may comprise one or more processors and memory storing program code which is executable by the one or more processors to cause client 120 to perform the actions attributed thereto herein.

Client 120 may thereby comprise an application server executing database applications to provide, for example, business reporting, inventory control, online shopping, and/or any other suitable functions. The database applications may, in turn, support presentation applications executed by end-user devices (e.g., desktop computers, laptop computers, tablet computers, smartphones, etc.). Such a presentation application may simply comprise a Web browser to access and display reports generated by a database application.

The data of database instance 110 may be received from disparate hardware and software systems, some of which are not interoperational with one another. The systems may comprise a back-end data environment employed in a business or industrial context. The data may be pushed to database instance 110 and/or provided in response to queries received therefrom.

Database instance 110 and each element thereof may also include other unshown elements that may be used during operation thereof, such as any suitable program code, scripts, or other functional data that is executable to interface with other elements, other applications, other data files, operating system files, and device drivers. These elements are known to those in the art, and are therefore not described in detail herein.

Figure 2:
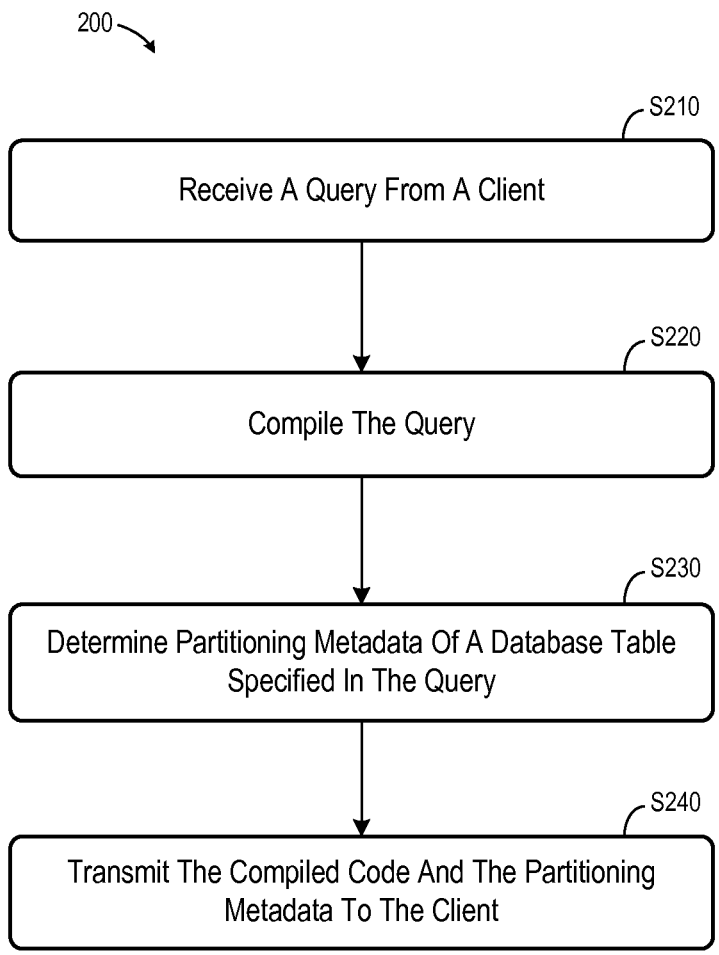
FIG. 2 is a flow diagram of a process according to some embodiments.

FIG. 2 comprises a flow diagram of process 200 according to some embodiments. Process 200 may be executed by any database node of a distributed database instance according to some embodiments. Process 200 and all other processes mentioned herein may be embodied in computer-executable program code read from one or more non-transitory computer-readable media, such as a floppy disk, a CD-ROM, a DVD-ROM, a Flash drive, a fixed disk and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S210, a query is received from a client. For example, database node 112 of instance 110 may receive a database query from client 120 at S210. The query may conform to any suitable compilable query language that is or becomes known, such as, for example, SQL.

Next, the receiving database node compiles the query at S220. According to some embodiments of S220, the database node executes a compiler associated with the language of the query, and compilation of the query results in compiled code. The compiled code is executable by any database node to execute the query on the data managed by the database node.

In this regard, partitioning metadata of a database table specified in the query is determined at S230. The partitioning metadata may be used to identify a partition of the database table to which particular table key values belong. The partitioning metadata may also specify database nodes to which each partition of the database table belongs. Accordingly, as will be described with respect to process 300, the partitioning metadata may be used to identify a database node based on table key values.

According to some embodiments, the partitioning metadata includes, but is not limited to, a partitioning criteria function having input parameters associated with table keys, and, for each partition of the database table specified in the query, an identifier of a database node storing the partition. Usage of this partitioning metadata according to some embodiments will be described in detail below.

The compiled query and the partitioning metadata are transmitted to the client at S240. As will be described below with respect to process 300, the partitioning metadata may allow the client to route subsequent executions of the query to an appropriate database node (i.e., to the database node which owns the desired portion of the database table).

Figure 3:
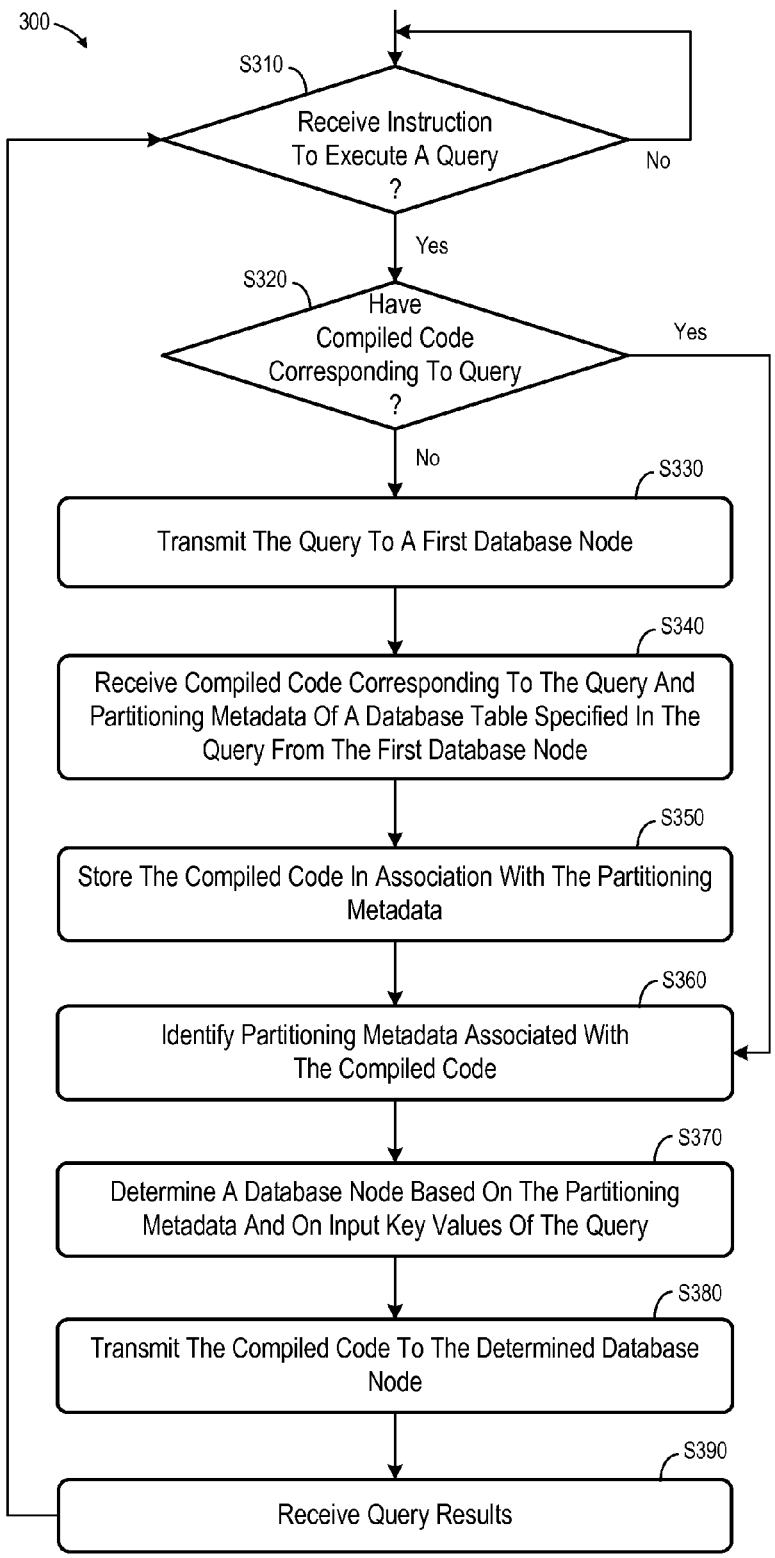
FIG. 3 is a flow diagram of a process according to some embodiments.

FIG. 3 comprises a flow diagram of process 300 according to some embodiments. Process 300 may be executed by a client device of a distributed database instance, such as but not limited to an application server, according to some embodiments.

Flow initially cycles at S310 until an instruction to execute a query is received. The instruction may be generated by internal processes of an application executing on an application server and/or received from a user device at S310.

Once a query is received, it is determined at S320 whether the client possesses compiled code corresponding to the query, as discussed above with respect to process 200. In one example of S320, a client checks a locally-stored library (e.g., an SQLDBC client library) to determine whether the compiled code resides in the library.

Figure 4:
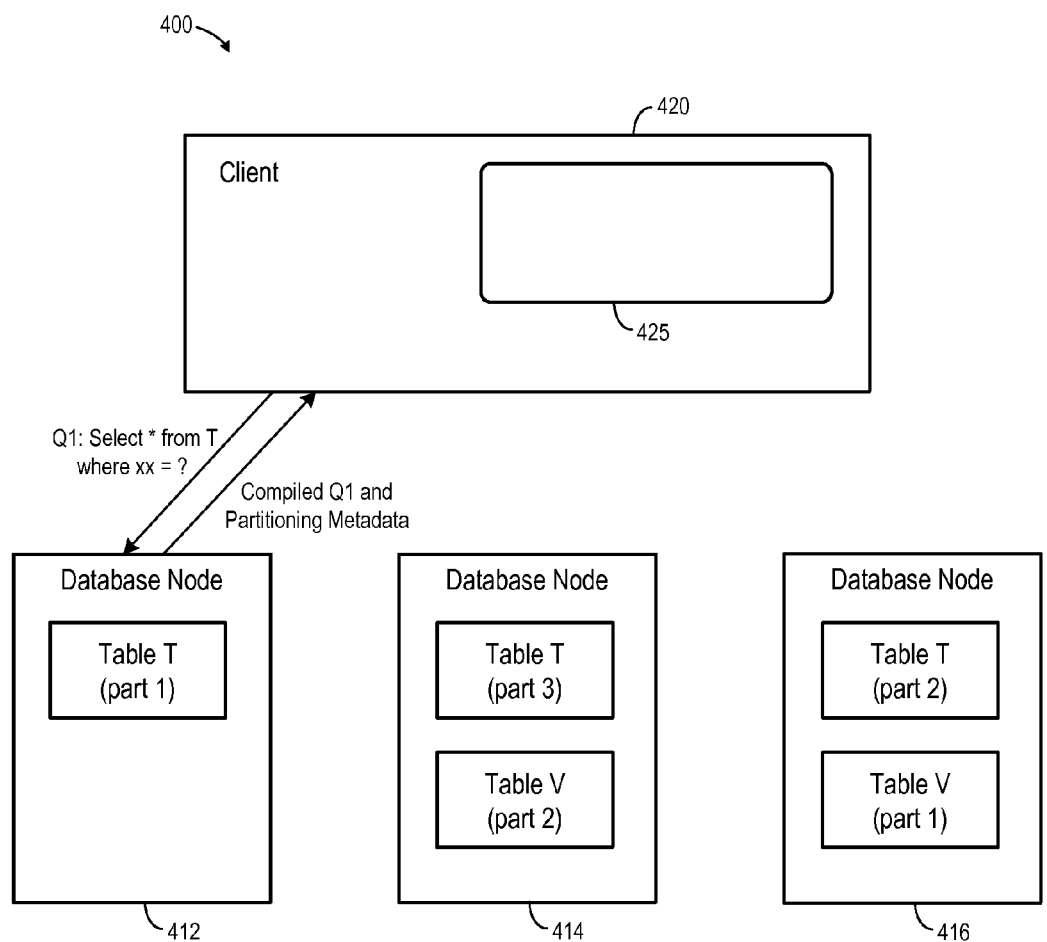
FIG. 4 is a block diagram illustrating operation of a system according to some embodiments.

FIG. 4 illustrates system 400 according to some embodiments. For purposes of the present example, it is assumed that client 420 executes process 300, and that library 425 of client 420 contains no compiled query code. Accordingly, the query to be executed is transmitted to a first database node at S330.

In the FIG. 4 example, the query "Select * from T where x=?" is transmitted to database node 412 at S330. Client 420 may transmit the query by calling a "Prepare Query" API exposed by database node 412. According to some embodiments, one or both of database nodes 414 and 416 also expose the Prepare Query API and therefore the query could alternatively be transmitted to either of these nodes at S330.

As described with respect to S210 through S240 of process 200, database node 412 may proceed to compile the query, determine partitioning metadata associated with a table specified by the query, and transmit the compiled code and the partitioning metadata to the client. Returning to process 300, compiled code corresponding to the query and the partitioning metadata are received at S340. FIG. 4 illustrates transmission of the query to database node 412 at S330 and reception of the compiled code and partitioning metadata at S340.

Figure 5:
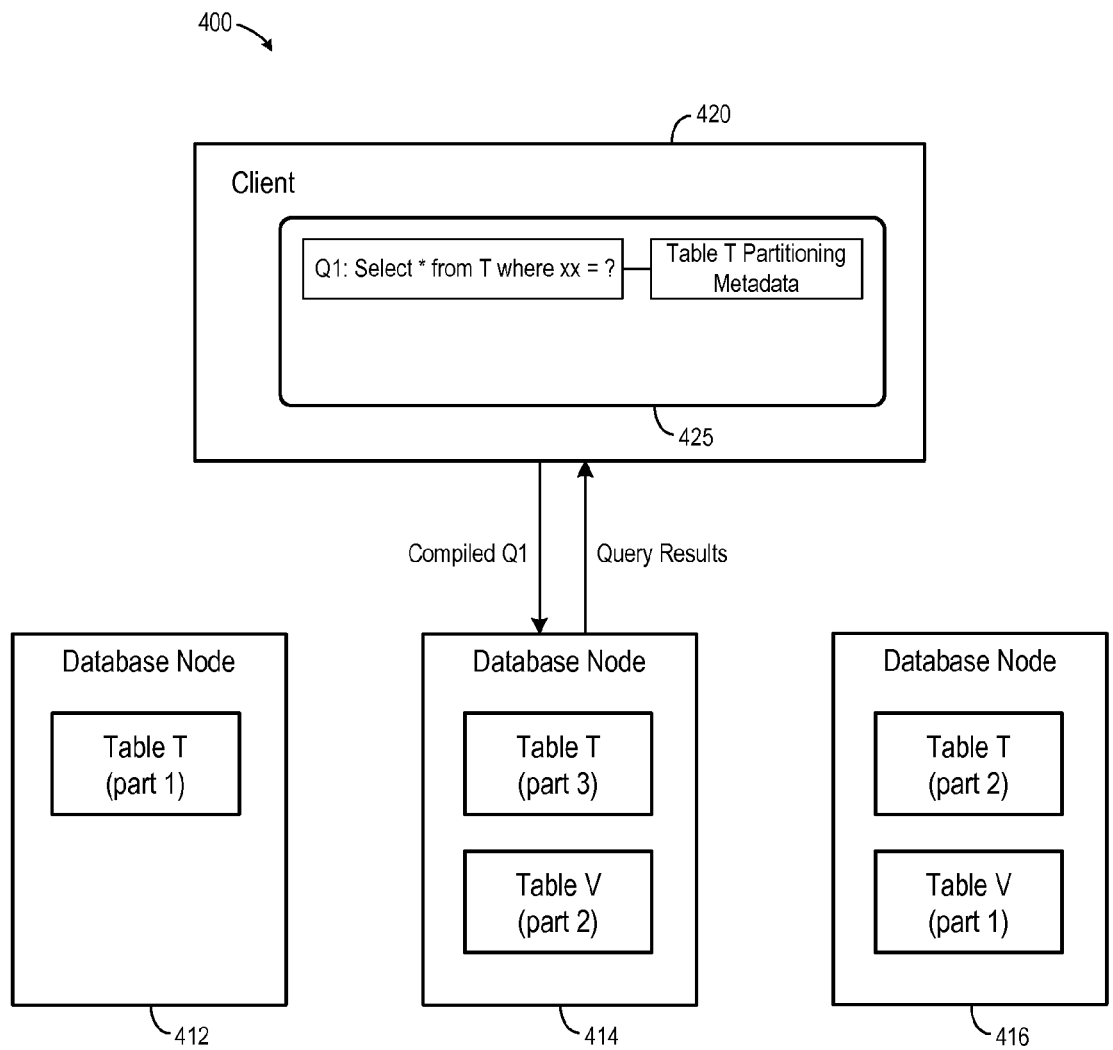
FIG. 5 is a block diagram illustrating operation of a system according to some embodiments.

The compiled code is stored in association with the partitioning metadata at S350. FIG. 5 illustrates storage of the compiled code 427 in association with the partitioning metadata of Table T in library 425 according to some embodiments. In this regard, "in association" indicates that the partitioning metadata may be located in memory by reference to the query Q1 and/or to the corresponding compiled code.

Next, at S360, partitioning metadata associated with the compiled query is identified. A database node is then determined based on the partitioning metadata and on key values of the query at S370. According to some embodiments, a partitioning criteria function of the partitioning metadata is evaluated at S370 using key values of the query as input parameters. The function outputs an indication of a partition of Table T which includes the data sought by the query. The partitioning metadata also includes information indicating the database node which stores the partition. Accordingly, this database node is determined at S370.

The compiled code corresponding to the query is transmitted to the determined database node at S380. According to some embodiments, client 420 transmits the compiled query to the identified database node by calling an "Execute Query" API exposed by database node 414, as shown in FIG. 5, and passes the compiled code as a parameter thereof. Database node 414, in response, executes the compiled code to perform the query and returns the query results to client 420. Client 420 receives the query results at S390 and flow returns to S310 to await another instruction.

Figure 6:
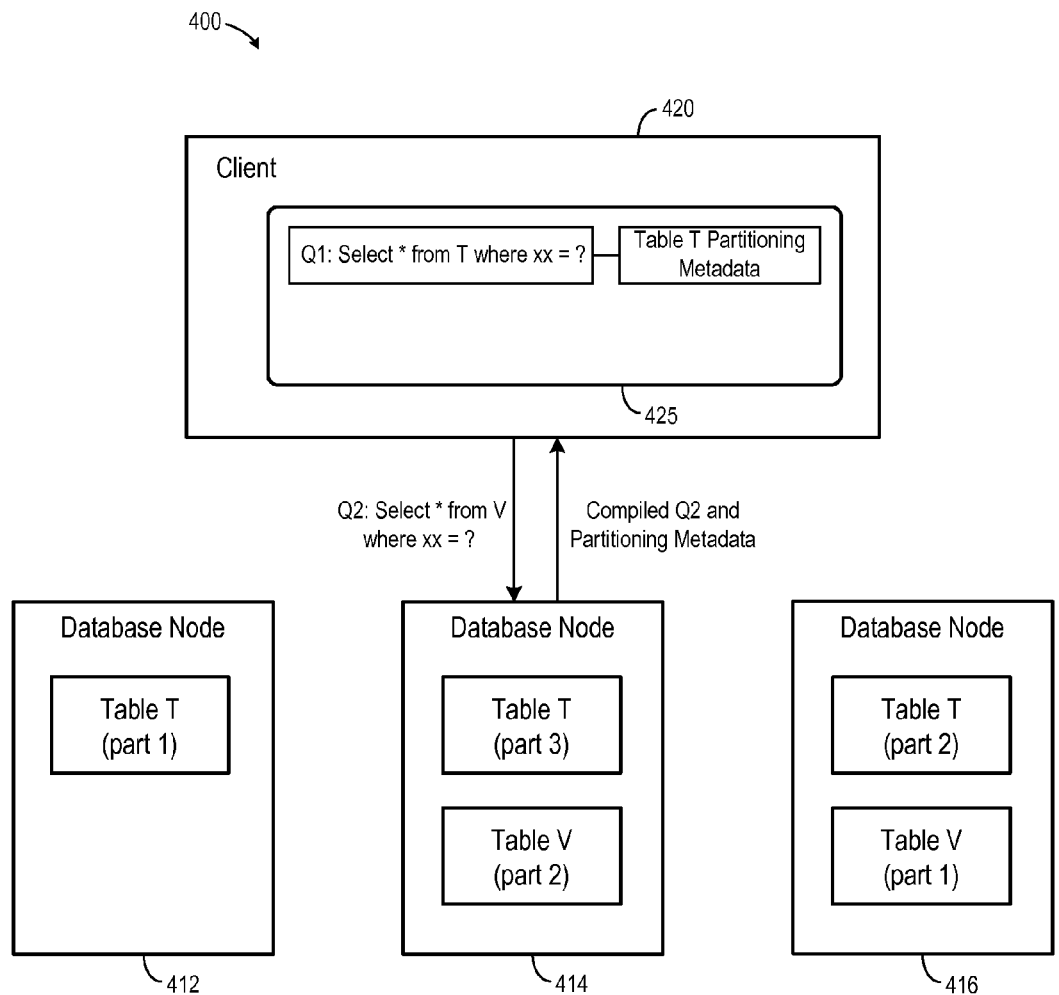
FIG. 6 is a block diagram illustrating operation of a system according to some embodiments.

FIG. 6 illustrates a scenario in which an instruction to execute another query (e.g., Select * from V where xx=?) is received at S310. Continuing with the present example, library 425 does not include compiled code corresponding to the query so the query is transmitted to a database node at S330.

According to FIG. 6, the query is transmitted to database node 414 in order to illustrate that process 200 may be independently executable by more than one node of a database instance. For example, database node 414 may also expose the above-mentioned "Prepare Query" API. Accordingly, database node 414 compiles the query, determines partitioning metadata associated with a table (i.e., Table V) specified by the query, and transmits the compiled code and the partitioning metadata to the client.

Figure 7:
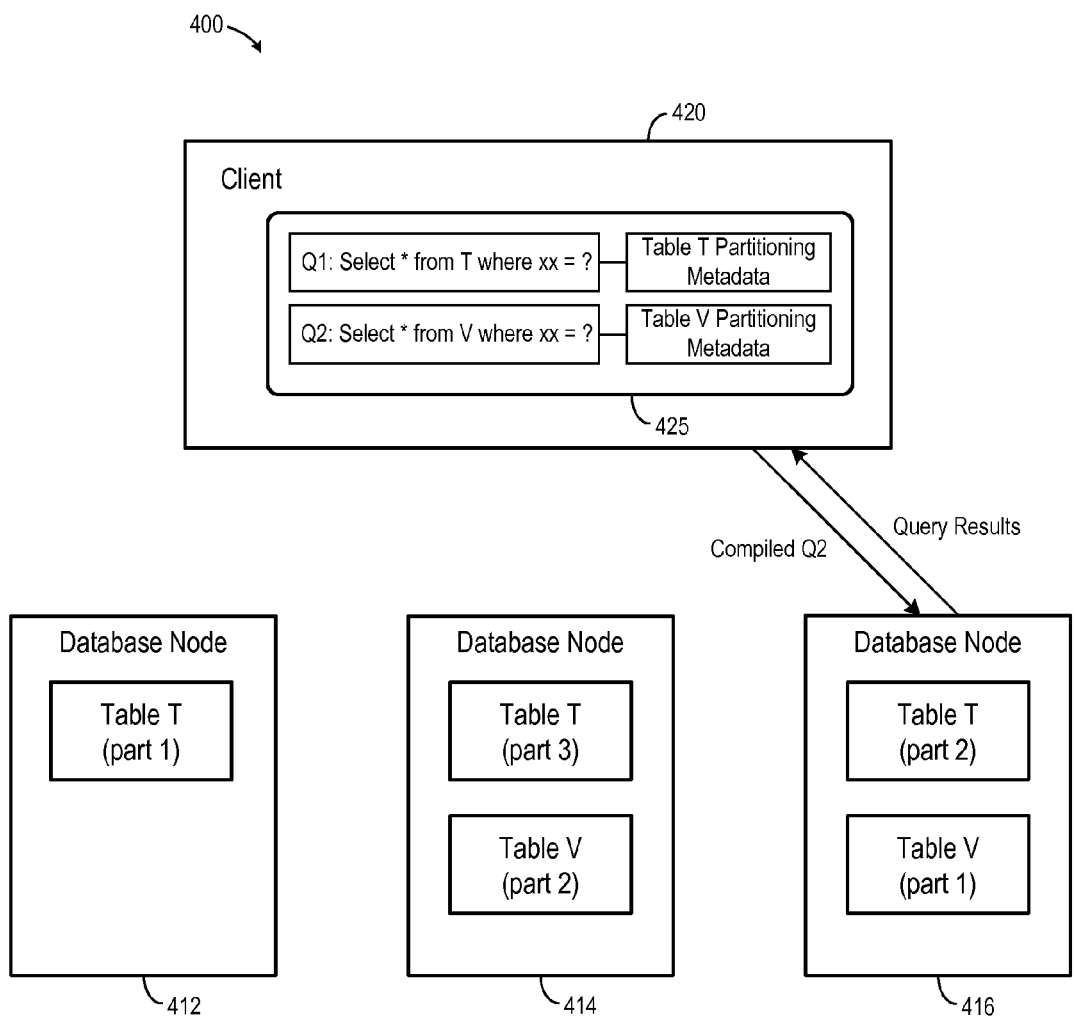
FIG. 7 is a block diagram illustrating operation of a system according to some embodiments.

The compiled code corresponding to the query, and the partitioning metadata, are received at S340 are received as also shown in FIG. 6, and stored in association with one another as shown in FIG. 7.

Next, at S360, partitioning metadata associated with the compiled query is identified. A database node is then determined based on the partitioning metadata and on key values of the query at S370. As previously described, a partitioning criteria function of the partitioning metadata may be evaluated at S370 using key values of the query as input parameters. The function outputs an indication of a partition of Table V which includes the data sought by the query. The partitioning metadata also includes information indicating the database node which stores the partition. Accordingly, this database node is determined at S370.

The compiled code corresponding to the query is transmitted to the determined database node at S380, as shown in FIG. 7. According to some embodiments, client 420 transmits the compiled query to the identified database node by calling an "Execute Query" API exposed by database node 416, and passes the compiled code as a parameter thereof. Database node 416, in response, executes the compiled code to perform the query and returns the query results to client 420. Client 420 receives the query results at S390 and flow returns to S310 to await another instruction.

Figure 8:
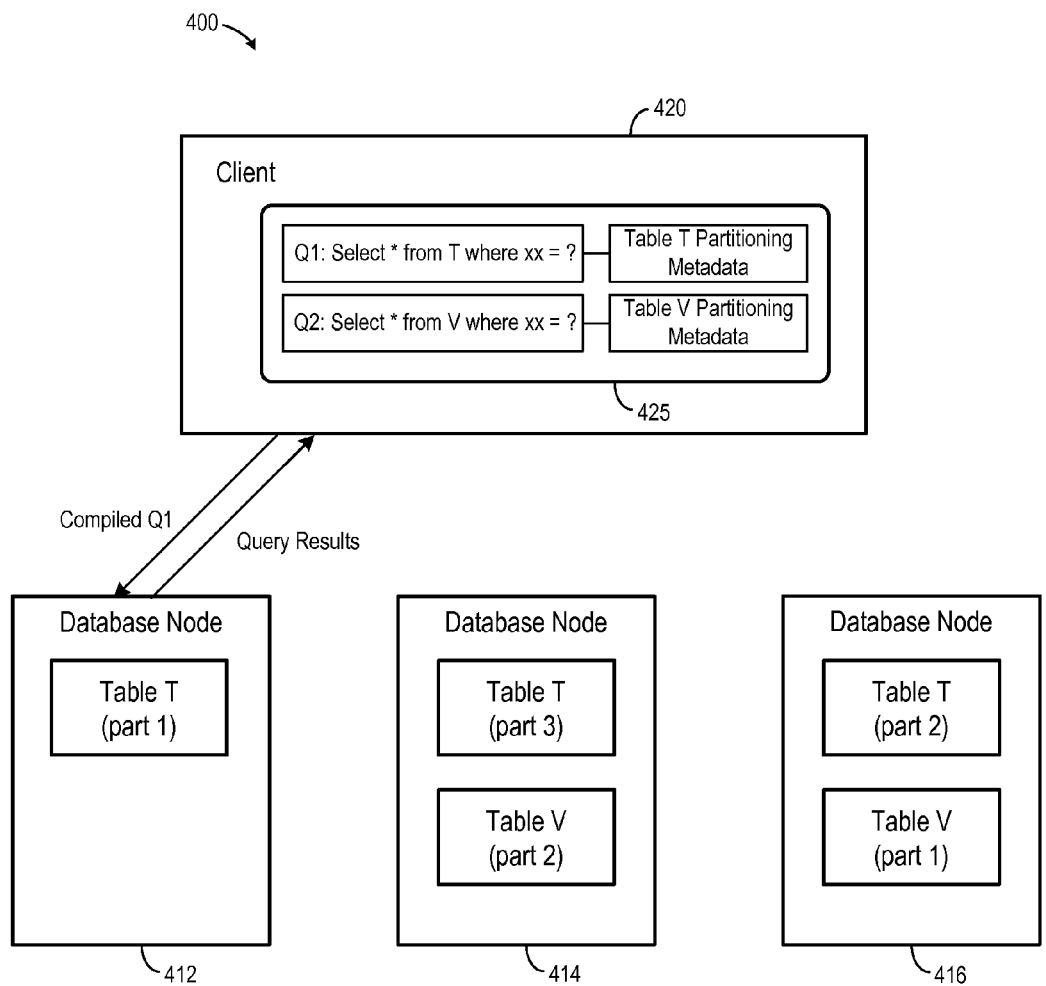
FIG. 8 is a block diagram illustrating operation of a system according to some embodiments.

It will now be assumed that an instruction to execute query Q1 is received at S310. Referring to FIG. 8, the determination at S320 is affirmative because library 425 includes compiled code corresponding to query Q1. Accordingly, flow proceeds directly to S360 to identify the previously-stored partitioning metadata associated with the compiled code, and to S370 to transmit the compiled query to a database node determined based on the partitioning metadata and on the key values of the new query Q1, as illustrated in FIG. 8. New query results are then received from the database node at S380.

Therefore, according to some embodiments, second and subsequent executions of a query may avoid S330, S340 and S350 of process 300, since the client will already possess both the compiled query and an identifier of a database node which is suitable for executing the query.

Figure 9:
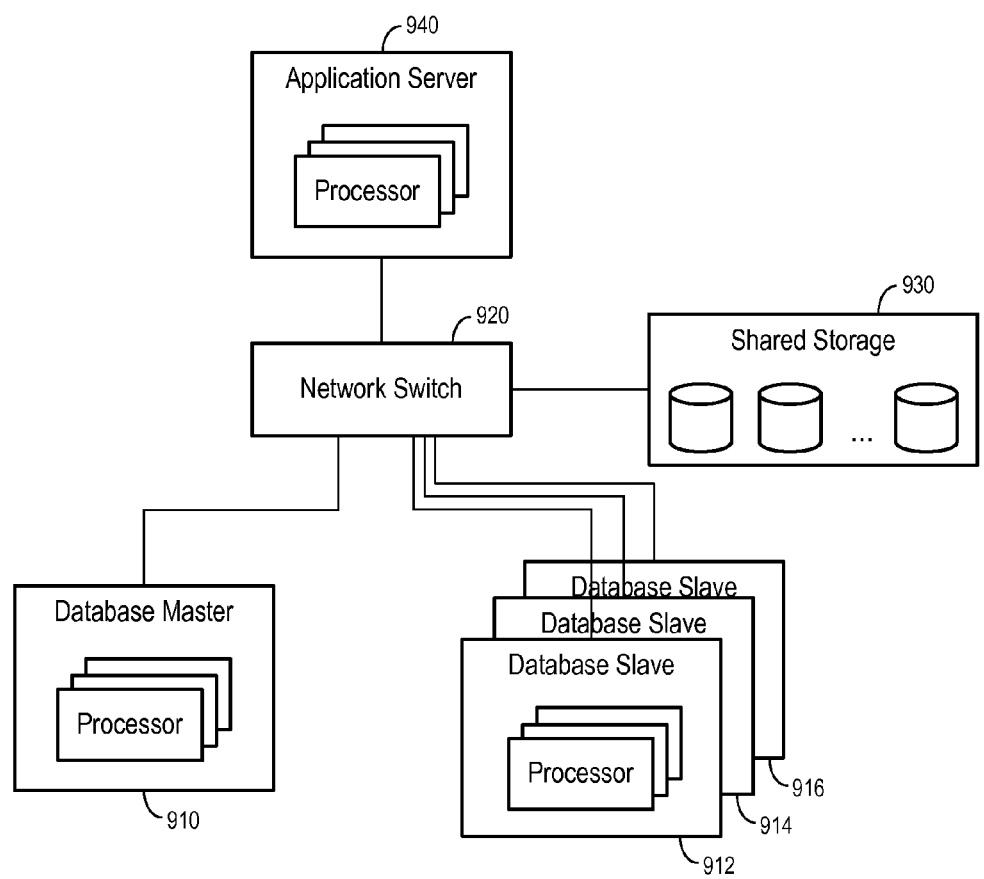
FIG. 9 is a block diagram of a hardware system according to some embodiments.

FIG. 9 is a block diagram of system 900 according to some embodiments. System 900 illustrates one hardware architecture implementing system 100 and/or 400 as described above, but implementations of either system 100 or 400 are not limited thereto. Elements of system 900 may therefore operate to execute process 200 and/or 300 as described above.

Database master 910 and each of database slaves 912, 914 and 916 may comprise a multi-processor "blade" server. Each of database master 910 and database slaves 912, 914 and 916 may operate as described herein with respect to database nodes, and database master 910 may perform additional transaction management functions and other master server functions which are not performed by database slaves 912, 914 and 916 as is known in the art.

Database master 910 and database slaves 912, 914 and 916 are connected via network switch 920, and are thereby also connected to shared storage 930. Shared storage 930 and all other memory mentioned herein may comprise any appropriate non-transitory storage device, including combinations of magnetic storage devices (e.g., magnetic tape, hard disk drives and flash memory), optical storage devices, Read Only Memory (ROM) devices, etc.

Shared storage 930 may comprise the persistent storage of a database instance distributed among database master 910 and database slaves 912, 914 and 916. As such, various portions of the data within shared storage 930 may be allotted (i.e., managed by) one of database master 910 and database slaves 912, 914 and 916.

Application server 940 may also comprise a multi-processor blade server. Application server 940, as described above, may execute database applications to provide functionality to end users operating user devices. Application server 940 may also execute process 300 to store compiled query code and associated node identifiers in local memory (not shown) for use in routing and executing database queries.

Embodiments described herein are solely for the purpose of illustration. Those in the art will recognize other embodiments may be practiced with modifications and alterations to that described above.

What is claimed is:

1. A method implemented by a computing system in response to execution of program code by a processor of the computing system, the method comprising:
receiving a first query from a client device at a first database node of a database instance comprising two or more database nodes, the first query specifying a first database table which is partitioned among two or more of the two or more database nodes;
determining first partitioning metadata of the first database table, the first partitioning metadata usable to identify one of the two or more database nodes based on table key values;
compiling the first query at the first database node to generate first compiled code;
transmitting the first compiled code and the first partitioning metadata from the first database node to the client device;
determining, at the client device, to execute the first query based on first input key values;
identifying, at the client device, the first compiled code and the first partitioning metadata based on the first query; and
identifying a second database node based on the first input key values and the first partitioning metadata.

2. The method according to claim 1, wherein the partitioning metadata comprises:
a partitioning criteria function having input parameters associated with table keys; and
for each partition of the first database table, an associated identifier of a database node storing the partition.

3. The method according to claim 1, further comprising:
storing the first compiled code in association with the first partitioning metadata in the client device;
transmitting the first compiled code from the client device to the second database node;
receiving the first compiled code at the second database node;
generating query results using the first compiled code at the second database node; and
transmitting the query results to the client device.

4. The method according to claim 3, wherein the partitioning metadata comprises:
a partitioning criteria function having input parameters associated with table keys; and
for each partition of the first database table, an associated identifier of a database node storing the partition; and
wherein identifying the second database node based on the first input key values and the first partitioning metadata comprises:
evaluating the partitioning function using the first input key values as the input parameters to determine a partition; and
determining the second database node based on the partition and an identifier associated with the partition.

5. The method according to claim 3, further comprising:
determining, at the client device, to execute the first query based on second input key values;
identifying, at the client device, the first compiled code and the first partitioning metadata based on the first query;
identifying a third database node based on the second input key values and the first partitioning metadata;
transmitting the first compiled code from the client device to the third database node;
receiving the first compiled code at the third database node;
generating second query results using the first compiled code at the third database node; and
transmitting the second query results to the client device.

6. A non-transitory computer-readable medium storing computer-executable program code, the program code executable by a computing device to:
receive a first query from a client device at a first database node of a database instance comprising two or more database nodes, the first query specifying a first database table which is partitioned among two or more of the two or more database nodes;

determine first partitioning metadata of the first database table, the first partitioning metadata usable to identify one of the two or more database nodes based on table key values;

compile the first query at the first database node to generate first compiled code;

transmit the first compiled code and the first partitioning metadata from the first database node to the client device;

determine, at the client device, to execute the first query based on first input key values;

identify, at the client device, the first compiled code and the first partitioning metadata based on the first query; and identify a second database node based on the first input key values and the first partitioning metadata.

7. The medium according to claim 6, wherein the partitioning metadata comprises:

a partitioning criteria function having input parameters associated with table keys; and for each partition of the first database table, an associated identifier of a database node storing the partition.

8. The medium according to claim 6, the program code further executable by a computing device to:

store the first compiled code in association with the first partitioning metadata in the client device;

transmit the first compiled code from the client device to the second database node;

receive the first compiled code at the second database node;

generate query results using the first compiled code at the second database node; and transmit the query results to the client device.

9. The medium according to claim 8, wherein the partitioning metadata comprises:

a partitioning criteria function having input parameters associated with table keys; and for each partition of the first database table, an associated identifier of a database node storing the partition; and wherein the program code executable to identify the second database node based on the first input key values and the first partitioning metadata comprises program code executable to:

evaluate the partitioning function using the first input key values as the input parameters to determine a partition; and determine the second database node based on the partition and an identifier associated with the partition.

10. The medium according to claim 8, the program code further executable by a computing device to:

determine, at the client device, to execute the first query based on second input key values;

identify, at the client device, the first compiled code and the first partitioning metadata based on the first query;

identify a third database node based on the second input key values and the first partitioning metadata;

transmit the first compiled code from the client device to the third database node;

receive the first compiled code at the third database node;

generate second query results using the first compiled code at the third database node; and transmit the second query results to the client device.

11. A system comprising:

a client device comprising a processor and a memory;

a first database node comprising a first processor and a first memory;

a second database node comprising a second processor and a second memory, the second database node to:

receive a first query from the client device, the first query specifying a first database table which is partitioned among the first database node and one or more other database nodes;

determine first partitioning metadata of the first database table, the first partitioning metadata usable to identify one of the first database node and one or more other database nodes based on table key values;

compile the first query to generate first compiled code;

transmit the first compiled code and the first partitioning metadata to the client device;

determine to execute the first query based on first input key values;

identify the first compiled code and the first partitioning metadata based on the first query; and identify the first database node based on the first input key values and the first partitioning metadata.

12. The system according to claim 11, wherein the partitioning metadata comprises:

a partitioning criteria function having input parameters associated with table keys; and for each partition of the first database table, an associated identifier of a database node storing the partition.

13. The system according to claim 11, the client to:

store the first compiled code in association with the first partitioning metadata;

transmit the first compiled code from the client device to the first database node;

receive the first compiled code at the first database node;

generate query results using the first compiled code at the first database node; and transmit the query results to the client device.

14. The system according to claim 13, wherein the partitioning metadata comprises:

a partitioning criteria function having input parameters associated with table keys; and for each partition of the first database table, an associated identifier of a database node storing the partition; and wherein identification of the first database node based on the first input key values and the first partitioning metadata comprises:

evaluation of the partitioning function using the first input key values as the input parameters to determine a partition; and determine the first database node based on the partition and an identifier associated with the partition.

15. The system according to claim 13, the client device to:

determine to execute the first query based on second input key values;

identify the first compiled code and the first partitioning metadata based on the first query;

identify one of the one or more other database nodes based on the second input key values and the first partitioning metadata;

transmit the first compiled code to the one database node;

receive the first compiled code at the one database node;

generate second query results using the first compiled code at the one database node; and transmit the second query results to the client device.

* * * * *